(12) United States Patent
Trainin et al.

(10) Patent No.: US 10,531,381 B2
(45) Date of Patent: Jan. 7, 2020

(54) DEVICE AND METHOD OF PROVIDING GRANT FRAME FOR BANDWIDTH SCHEDULING

(71) Applicant: Intel IP Corporation, Santa Clara, CA (US)

(72) Inventors: Solomon B. Trainin, Haifa (IL); Assaf Kasher, Haifa (IL); Carlos Cordeiro, Portland, OR (US); Laurent Cariou, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 59 days.

(21) Appl. No.: 15/969,330

(22) Filed: May 2, 2018

(65) Prior Publication Data

US 2018/0324695 A1  Nov. 8, 2018

Related U.S. Application Data

(63) Continuation of application No. 15/084,848, filed on Mar. 30, 2016, now Pat. No. 9,992,741.

(Continued)

(51) Int. Cl.
*H04W 52/02* (2009.01)
*H04W 74/08* (2009.01)
*H04W 84/12* (2009.01)

(52) U.S. Cl.
CPC ... *H04W 52/0216* (2013.01); *H04W 52/0229* (2013.01); *H04W 74/0816* (2013.01);
(Continued)

(58) Field of Classification Search
CPC .............. H04W 52/0216; H04L 74/0816
See application file for complete search history.

(56) References Cited

U.S. PATENT DOCUMENTS 9,844,075 B2  12/2017  Grandhi et al.
9,992,741 B2   6/2018  Trainin et al.
(Continued)

FOREIGN PATENT DOCUMENTS

| EP | 3371959 | 9/2018 |
|---|---|---|
| WO | WO-2015076855 A1 | 5/2015 |
| WO | WO-2017123322 A1 | 7/2017 |

OTHER PUBLICATIONS

"European Application Serial No. 16885400.8, Response filed Feb. 14, 2019 to Communication pursuant to Rules 161(2) and 162 EPC dated Aug. 20, 2018", 28 pgs.

(Continued)

*Primary Examiner* — Zhiren Qin
(74) *Attorney, Agent, or Firm* — Schwegman Lundberg & Woessner, P.A.

(57) ABSTRACT

Devices and methods of limiting wideband STA communication are generally described. The STA receives, over a primary channel, a wakeup frame containing an indication of a SP or CBAP to acquire a wideband TXOP over a wide bandwidth channel including the primary channel and a secondary channel and a control trailer having an indication of the wide bandwidth channel. Prior to the SP/CBAP, the STA opens reception from the primary channel to the wide bandwidth channel. The STA then communicates with another STA over the wide bandwidth channel and subsequently reduces reception from the wide bandwidth channel to the primary channel. The wakeup frame originates from an AP/PCP or the other STA, and contains fields indicating the wakeup frame length and SP or a sensing time length prior to the CBAP.

24 Claims, 7 Drawing Sheets

Related U.S. Application Data

(60) Provisional application No. 62/277,042, filed on Jan. 11, 2016.

(52) U.S. Cl.
CPC ............. *H04W 84/12* (2013.01); *Y02D 70/00* (2018.01); *Y02D 70/1226* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/22* (2018.01)

(56) References Cited

U.S. PATENT DOCUMENTS

| | | |
|---|---|---|
| 2012/0099530 A1 | 4/2012 | Morioka et al. |
| 2012/0327870 A1 | 12/2012 | Grandhi et al. |
| 2013/0136016 A1 | 5/2013 | Lee et al. |
| 2013/0229996 A1 | 9/2013 | Wang et al. |
| 2014/0192788 A1 | 7/2014 | Park et al. |
| 2015/0249990 A1 | 9/2015 | Kadiyala et al. |
| 2015/0312279 A1 | 10/2015 | Wentink et al. |
| 2016/0037553 A1 | 2/2016 | Attar et al. |
| 2016/0227533 A1 | 8/2016 | Josiam et al. |
| 2017/0134145 A1 | 5/2017 | Xin et al. |
| 2017/0202011 A1 | 7/2017 | Trainin et al. |
| 2017/0332277 A1* | 11/2017 | Xin ...................... H04W 28/06 |
| 2018/0069669 A1* | 3/2018 | Park ..................... H04B 7/0695 |
| 2019/0007964 A1* | 1/2019 | Park ..................... H04W 72/04 |
| 2019/0052395 A1* | 2/2019 | Motozuka ............. H04L 1/0003 |
| 2019/0140730 A1* | 5/2019 | Oteri .................... H04B 7/0452 |
| 2019/0208463 A1* | 7/2019 | Lou ..................... H04B 7/0413 |

OTHER PUBLICATIONS

"U.S. Appl. No. 15/084,848, Notice of Allowance dated Feb. 2, 2018", 21 pgs.

"International Application Serial No. PCT/US2016/062578, International Preliminary Report on Patentability dated Jul. 26, 2018", 6 pgs.

"International Application Serial No. PCT/US2016/062578, International Search Report dated Feb. 21, 2017", 4 pgs.

"International Application Serial No. PCT/US2016/062578, Written Opinion dated Feb. 21, 2017", 4 pgs.

"European Application Serial No. 16885400.8, Extended European Search Report dated Aug. 19, 2019", 11 pgs.

Carlos, Cordeiro, "Specification Framework for TGay", IEEE 802.11-15 01358r3, (Nov. 8, 2015), 1-8.

* cited by examiner

DEVICE AND METHOD OF PROVIDING GRANT FRAME FOR BANDWIDTH SCHEDULING

PRIORITY CLAIM

This application is a continuation of U.S. patent application Ser. No. 15/084,848, filed Mar. 30, 2016, now issued as U.S. Pat. No. 9,992,741, which claims the benefit of priority to U.S. Provisional Patent Application Ser. No. 62/277,042, filed Jan. 11, 2016, and entitled "GRANT FRAME FOR BANDWIDTH SCHEDULING," each of which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard, the IEEE 802.11ax study group (SG) (named DensiFi) or IEEE 802.11ay. Some embodiments relate to channel access by a station (STA). Some embodiments relate to a station (STA) implementing a combination of narrowband and wideband reception.

BACKGROUND

The use of personal communication devices has increased astronomically over the last two decades. The penetration of mobile devices (also referred to as stations (STAs)) in modern society has continued to drive demand for a wide variety of networked devices in a number of disparate environments. The use of networked STAs using a variety of communication protocols has increased in all areas of home and work life. Unfortunately, the vast explosion of mobile devices, in addition to the increase in usage of bandwidth-intensive applications may result in spectrum resources being highly taxed. To increase throughput, operators have continued to install an increasing number of access points (APs) for communications. In some circumstances, however, it may be impracticable to install additional APs, while in other circumstances it may be desirable to increase throughput to particular STAs through judicious selection of existing channel resources. The latter mechanism may have drawbacks, including the inability of the STA to maintain the desired bandwidth due to power consumption and interference.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
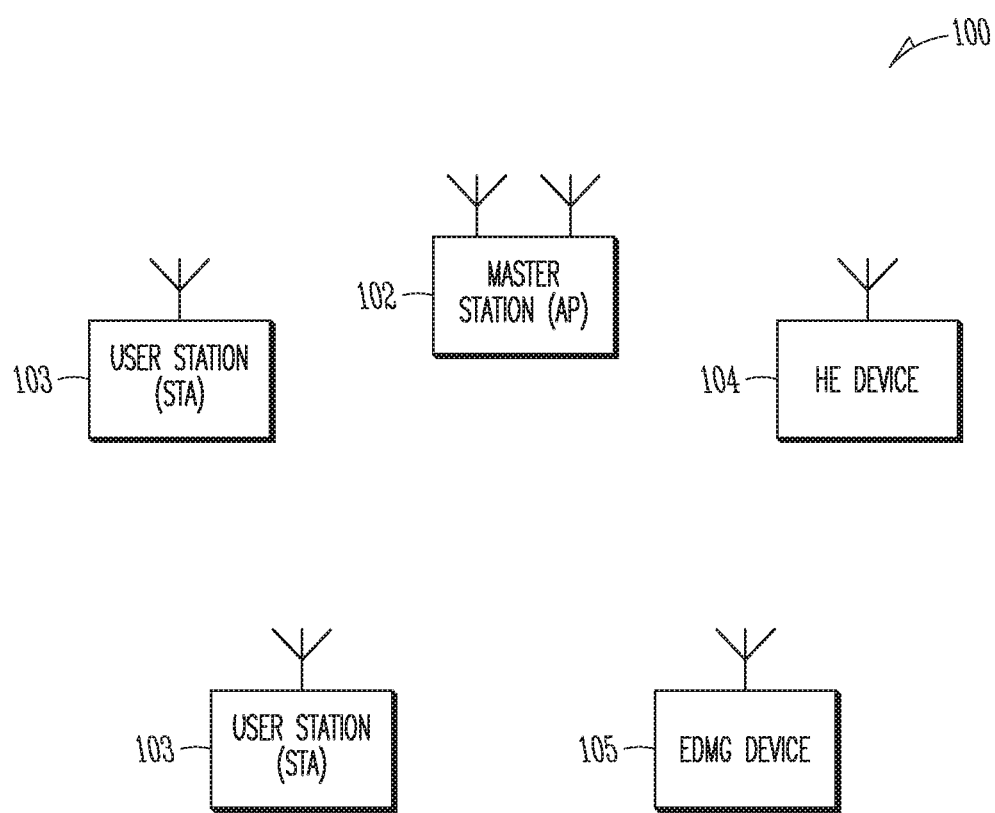
FIG. 1 is a functional diagram of a wireless network in accordance with some embodiments.

FIG. 1 illustrates a wireless network in accordance with some embodiments. Elements in the network 100 may engage in channel bonding, as described herein. In some embodiments, the network 100 may be an Enhanced Directional Multi Gigabit (EDMG) network. In some embodiments, the network 100 may be a High Efficiency (HE) Wireless Local Area Network (WLAN), a controlled channel access network, hybrid coordination function (HCF) controlled channel access (HCCA) or Wi-Fi network. These embodiments are not limiting, however, as some embodiments of the network 100 may include a combination of such networks. As an example, the network 100 may support EDMG devices in some cases, non EDMG devices in some cases, and a combination of EDMG devices and non EDMG devices in some cases. As another example, the network 100 may support HE devices in some cases, non HE devices in some cases, and a combination of HE devices and non HE devices in some cases. As another example, some devices supported by the network 100 may be configured to operate according to EDMG operation and/or HE operation and/or legacy operation. Accordingly, it is understood that although techniques described herein may refer to a non EDMG device, an EDMG device, a non HE device or an HE device, such techniques may be applicable to any or all such devices in some cases.

The network 100 may include any number (including zero) of master stations (STA) 102, user stations (STAs) 103 (legacy STAs), HE stations 104 (HE devices), and EDMG stations 105 (EDMG devices). It should be noted that in some embodiments, the master station 102 may be a stationary non-mobile device, such as an access point (AP) or personal basic service set (PBSS) control point (PCP). In some embodiments, the STAs 103 may be legacy stations. These embodiments are not limiting, however, as the STAs 103 may be HE devices or may support HE operation in some embodiments. In some embodiments, the STAs 103 may be EDMG devices or may support EDMG operation. It should be noted that embodiments are not limited to the number of master STAs 102, STAs 103, HE stations 104 or EDMG stations 105 shown in the example network 100 in FIG. 1. Legacy STAs 103 may include, for example, DMG STA (e.g., IEEE 802.11ad stations), non-HT STA (e.g., IEEE 802.11a/g stations), HT STA (e.g., IEEE 802.11n stations), and VHT STA (e.g., IEEE 802.11ac stations).

The master station 102 may be arranged to communicate with the STAs 103 and/or the HE STAs 104 and/or the EDMG STAs 105 in accordance with one or more of the IEEE 802.11 standards. In accordance with some embodiments, an AP may operate as the master station 102 and may be arranged to contend for a wireless medium (e.g., during a contention period) to receive exclusive control of the medium for a HE control period (i.e., a transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. In some embodiments, the STAs 103 may communicate in accordance with a contention-based communication technique, rather than a non-contention based multiple access technique. During the HE control period, the master station 102 may communicate with HE stations 104 using one or more HE frames. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the HE control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HE communication may be configured for transmitting a number of spatial streams.

In some embodiments, EDMG communication may be configurable to use channel resources that may include one or more frequency bands of 2.16 GHz, 4.32 GHz or other bandwidth. Such channel resources may or may not be contiguous in frequency. As a non-limiting example, EDMG communication may be performed in channel resources at or near a frequency band of 60 GHz.

In some embodiments, primary channel resources may include one or more such bandwidths, which may or may not be contiguous in frequency. As a non-limiting example, channel resources spanning a 2.16 GHz bandwidth may be designated as the primary channel resources. As another non-limiting example, channel resources spanning a 20 MHz bandwidth may be designated as the primary channel resources. In some embodiments, secondary channel resources may also be used, which may or may not be contiguous in frequency. As a non-limiting example, the secondary channel resources may include one or more frequency bands of 2.16 GHz bandwidth or other bandwidth. As another non-limiting example, the secondary channel resources may include one or more frequency bands of 20 MHz bandwidth or other bandwidth.

In some embodiments, the primary channel resources may be used for transmission of control messages, beacon frames or other frames or signals by the AP 102. As such, the primary channel resources may be at least partly reserved for such transmissions. In some cases, the primary channel resources may also be used for transmission of data payloads and/or other signals. In some embodiments, the transmission of the beacon frames may be restricted such that the AP 102 does not transmit beacons on the secondary channel resources. Accordingly, beacon transmission may be reserved for the primary channel resources and may be restricted and/or prohibited in the secondary channel resources, in some cases.

In some demonstrative embodiments, channel bonding may be used in communications between the various devices, for example, the STAs 103. In channel bonding, two or more channels may be used simultaneously, e.g., in the same physical layer (PHY) packet to achieve higher throughput. Due to the directional nature of transmissions in the 60 GHz band, to use channel bonding a clear channel may be assessed before transmission. Thus, both sides of a particular link, i.e., the TXOP initiator and the TXOP responder, may assess the clear channel prior to transmission. Every wideband transmission opportunity may start with a Request to Send (RTS) and a Clear to Send (CTS) (RTS/CTS) protocol.

For example, a STA 103 may transmit a RTS message to the AP 102. After a Short Inter Frame Space (SIFS) period, if the medium is available, the AP 102 may respond to the RTS by broadcasting a CTS message. After the CTS message is received by the STA 103, the STA 103 may then transmit the data packet to the AP 102 during the TXOP. If the medium becomes busy before the backoff counter reaches zero, the STA 103 may sense when the medium again becomes available and transmit another RTS message to the AP 102.

After each transmission, the STA 103 may pick a new backoff time. If the last transmission was unsuccessful, as evidenced by the lack of reception of the ACK by the STA 103, the STA 103 may extend the contention window for backoff time drawing used for retransmission.

In some embodiments, STAs may use a Short Inter Frame Space (SIFS) for the RTS/CTS message and for a positive ACK-based high priority transmission. Once the SIFS duration elapses, the transmission can immediately start. Depending on the physical layer configuration, the SIFS duration may be 3, 6, 10 or 28 μs. A PCF Inter Frame Space (PIFS) may be used by the PCF during contention free operations, and when retransmission happens inside transmission opportunity. After the PIFS period elapses, STAs having data to be transmitted in contention free period can be initiated. The DIFS period is the minimum idle time for contention based services. STAs may access the channel immediately if it is free after the DIFS period. The EIFS period may be used, as above, when there erroneous frame is received. The Arbitration Inter Frame Space period (AIFS) may be used by QoS STAs to transmit all frames (data and control).

In particular, the physical part of the CCA process may be performed by the physical layer. The physical layer can be divided into two sublayers. The sublayers may include the physical medium dependent (PMD, lower sublayer) and the physical layer convergence procedure (PLCP, upper sublayer). The physical layer may determine whether the channel is clear and communicate this to the MAC layer. The PMD may indicate to the PLCP sublayer whether the medium is in use. The PLCP sublayer may communicate with the MAC layer to indicate a busy or idle medium, which may prevent the MAC layer from attempting to forward a frame for transmission. Physical CCA, may include both energy detection (ED) and preamble detection. For the preamble detection, the STA 103 may detect and decode a preambles defined in IEEE 802.11 standard. For the ED detection, the STA 103 may detect energy of the substantial level in the operating channel. If the non-WiFi energy exceeds the ED threshold for a predetermined amount of time, the STA 103 may determine that the medium is busy.

Figure 2:
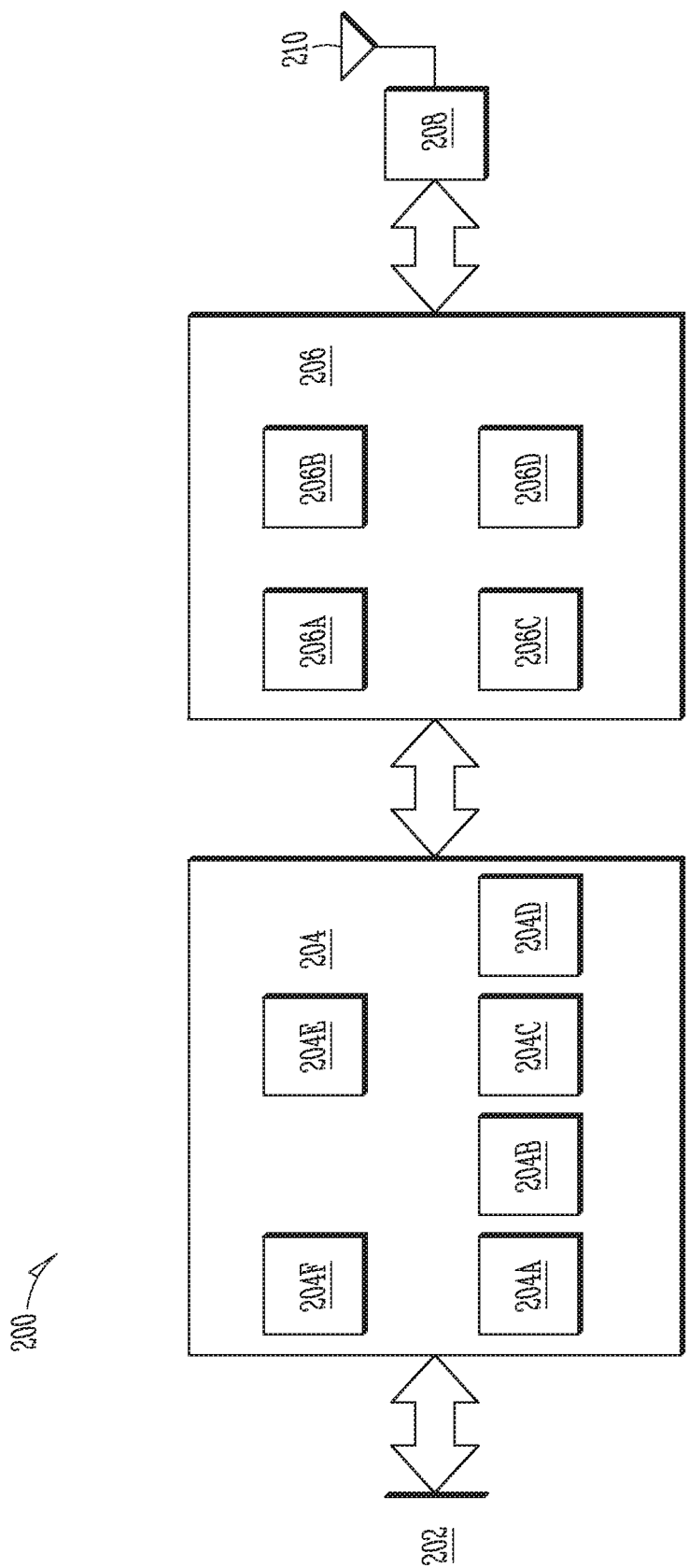
FIG. 2 illustrates components of a communication device in accordance with some embodiments.

Embodiments described herein may be implemented into a system using any suitable configured using any suitably configured hardware and/or software. FIG. 2 illustrates components of a communication device in accordance with some embodiments. The communication device 200 may be one of the or STAs 103 shown in FIG. 1 and may be a stationary, non-mobile device or may be a mobile device. In some embodiments, the communication device 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the PCP or AP may contain some or all of the components shown in FIG. 2.

The application or processing circuitry 202 may include one or more application processors. For example, the application circuitry 202 may include circuitry such as, but not limited to, any combination of one or more single core or multi-core general-purpose processors and/or dedicated processor, graphics processors, application processors. The processors may be coupled with and/or may include memory/storage to execute instructions stored in the memory/storage to enable various applications and/or operating system operations to run on the system.

The baseband circuitry 204 may include circuitry such as, but not limited to, one or more single-core or multi-core processors. The baseband circuitry 204 may include one or more baseband processors and/or logic control to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via RF circuitry 206. The radio control functions may include, but are not limited to, single modulation/demodulation, encoding/decoding, radio frequency modulation/demodulation shifting. In some embodiments, modulation/demodulation circuitry of the baseband circuitry 204 may include Fast-Fourier Transform (FFT), preceding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access (network (EUTRAN and/or IEEE 802.11 protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio (EUTRAN) and/other wireless area metropolitan networks (WMAN), wireless local area network (WLAN), wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802 ad, which operates in the 60 GHz millimeter wave spectrum, and 802.11ax, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using electromagnetic radiation though a non-solid medium. In various embodiments, the modulation RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, there Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the communication device 200 may include additional elements such as, for example, memory/storage, display, camera, sensor, and/or input/output (I/O) interface as described in more detail below. In some embodiments, the communication device 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
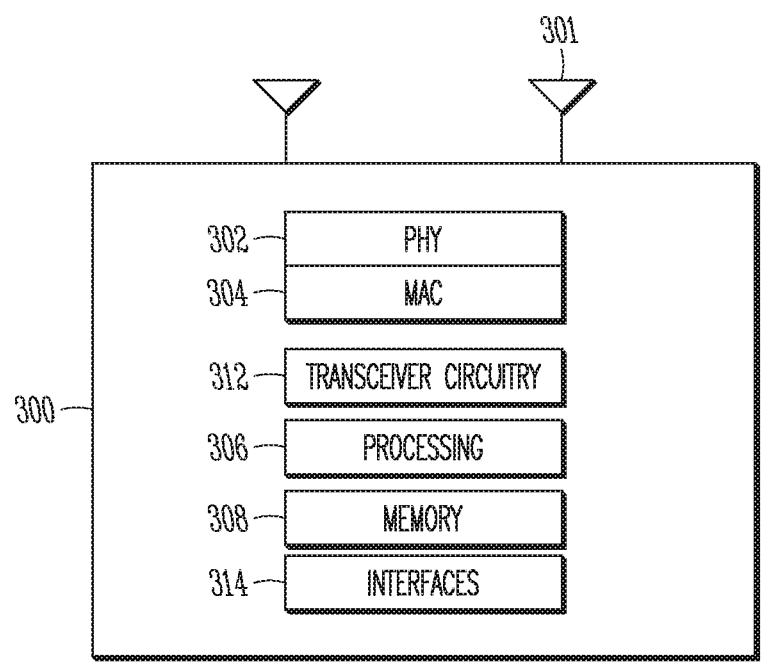
FIG. 3 illustrates a block diagram of a communication device in accordance with some embodiments.

FIG. 3 is a block diagram of a communication device in accordance with some embodiments. The communication device 300 may be a STA 103 or AP 102 shown in FIG. 1. In addition, the communication device 300 may also be suitable for use as an HE device 104 as shown in FIG. 1, such as an HE station. In some embodiments, the communication device 300 may be suitable for use as an EDMG device 105 as shown in FIG. 1, such as an EDMG station. Some of the components shown in FIG. 3 may not be present in all of the devices in FIG. 1.

The communication device 300 may include physical layer circuitry 302 for enabling transmission and reception of signals to and from the master station 102, HE devices 104, EDMG devices 105, other STAs 103, APs and/or other devices using one or more antennas 201. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

In some embodiments, the communication device 300 may be configured as an HE device 104 (FIG. 1) and/or an EDMG device 105 (FIG. 1), and may communicate using OFDM communication signals over a multicarrier communication channel. Accordingly, in some cases the communication device 300 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards and/or proposed EDMG standards, although the scope of the application is not limited in this respect as they may also be suitable to transmit and/or receive communications in accordance with other techniques and standards. In some other embodiments, the communication device 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In accordance with embodiments, the STA 103 may transmit a grant frame to indicate a transmission of a data payload by the STA 103 during a grant period. The grant frame may indicate whether the data payload is to be transmitted on primary channel resources or on secondary channel resources. The STA 103 may transmit the data payload to a destination STA 103 on the secondary channel resources when the grant frame indicates that the data payload is to be transmitted on the secondary channel resources. The grant frame may be transmitted on the primary channel resources and on the secondary channel resources when the grant frame indicates that the data payload is to be transmitted on the secondary channel resources. When the grant frame indicates that the data payload is to be transmitted on the primary channel resources, the grant frame may be transmitted on the primary channel resources and the STA 103 may refrain from transmission of the grant frame on the secondary channel resources. These embodiments will be described in more detail below.

In some embodiments, the channel resources may be used for downlink transmission by the AP 102 and for uplink transmissions by the STAs 103. That is, a time-division duplex (TDD) format may be used. In some embodiments, the channel resources may be used for direct communication between one or more STAs 103. For instance, the STAs 103 may be configured to communicate in a PCP STA) mode. As another example, the STAs 103 may be configured to communicate in a (non-PCP/AP) mode.

In some cases, the channel resources may include multiple channels, such as the 20 MHz channels or 2.16 GHz channels previously described. The channels may include multiple sub-channels or may be divided into multiple sub-channels for the uplink transmissions to accommodate multiple access for multiple STAs 103. The downlink transmissions and/or the direct transmissions between STAs 103 may or may not utilize the same format.

In some embodiments, the sub-channels may comprise a predetermined bandwidth. As a non-limiting example, the sub-channels may each span 2.03125 MHz, the channel may span 20 MHz. and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax and/or 802.11ay), a 3GPP standard or other standard.

In some embodiments, the sub-channels may comprise multiple sub-carriers. Although not limited as such, the sub-carriers may be used for transmission and/or reception of OFDM or OFDMA signals as well SC signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 4:
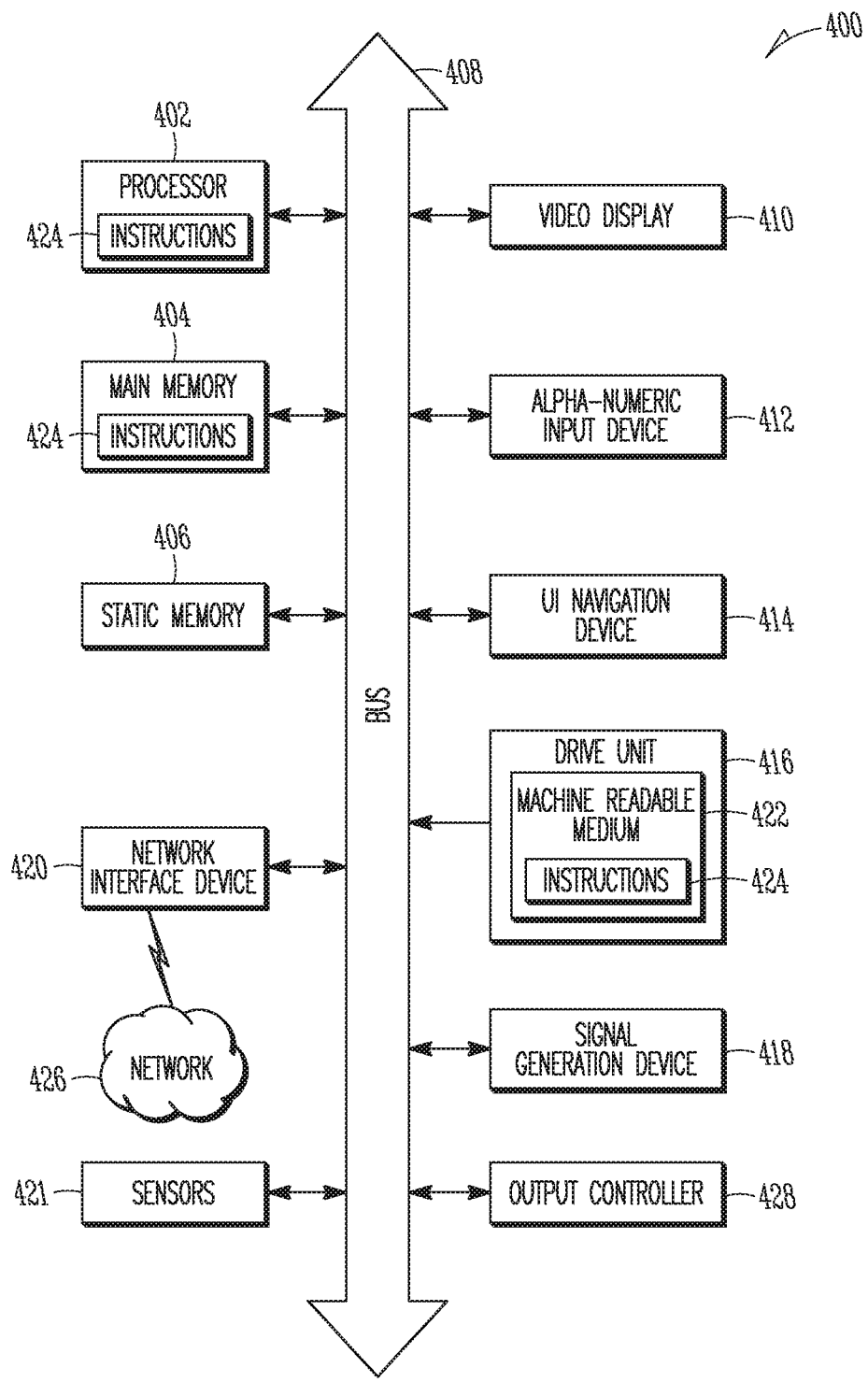
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, AP, PCP, STA, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM), and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards. IEEE 802.16 family of standards). IEEE 802.15.4 family of standards, a LTE family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As above, channel bonding in accordance with IEEE 802.11ay may be used to increase throughput for communication with a particular STA (whether the STA is a TXOP initiator or responder), whether the particular STA is a STA 103, AP/PCP 102, HE device 104 or EDMG device 105. The RTS/CTS protocol may be used when channel bonding is employed. When engaged in RTS/CTS, both sides of a link may be open for reception over the entire bandwidth before a TXOP holder transmits an RTS frame. Under normal conditions, the bandwidth may be limited and the TXOP may occur fairly quickly. However, when channel bonding is used, the bandwidth of each TXOP increases, which may lead to a decrease in TXOP availabilities when the overall bandwidth remains the same. This may lead to increased battery drain of the STA as well as opening the STA to an increased amount of interference as the STA may open its receiver to a wider bandwidth for a longer period of time. Accordingly, it may be advantageous to allow a STA to use a narrower bandwidth single channel for most TXOPs and switch to using the wider bandwidth bonded channel just before an expected start of a wide bandwidth or channel bonding TXOP to engage in the wide bandwidth TXOP. To accomplish this, a special frame may be sent from the AP (or another STA) to announce to a peer device a time at which a TXOP using a wider bandwidth is expected. This frame is referred to herein as a wakeup frame or a scheduling frame. In some embodiments, as discussed in more detail below, the wakeup frame may be a modified Grant frame, defined in IEEE 802.11ad. In other embodiments, any other frame type, format and/or structure may be used. After engaging in the wide bandwidth TXOP, the STA may once again communicate over the narrow bandwidth, e.g., the primary channel, only. In some embodiments, the STA may reduce reception from the wide bandwidth channel to the primary channel in response to termination of the wideband TXOP.

A Grant frame may be used in dynamic allocation for directional multigigabit (DMG) STAs. Dynamic allocation allows for near-real-time reservation of channel time with the AP (or PCP) in which the channel bandwidth used may be dynamically allocated on a transaction by transaction basis (based on, e.g., real time data such as Received Signal Strength Indications (RSSI), blocking probability, channel occupancy, traffic). Dynamic allocation may be used to describe a service period and a contention-based access period mechanism. For example, the AP can poll a STA and receive requests for channel time allocation. Based on the received requests, the AP can accept a request and immediately allocate (within the same beacon interval) channel time for the STA to communicate with another STA by using a Grant frame.

Figure 5:
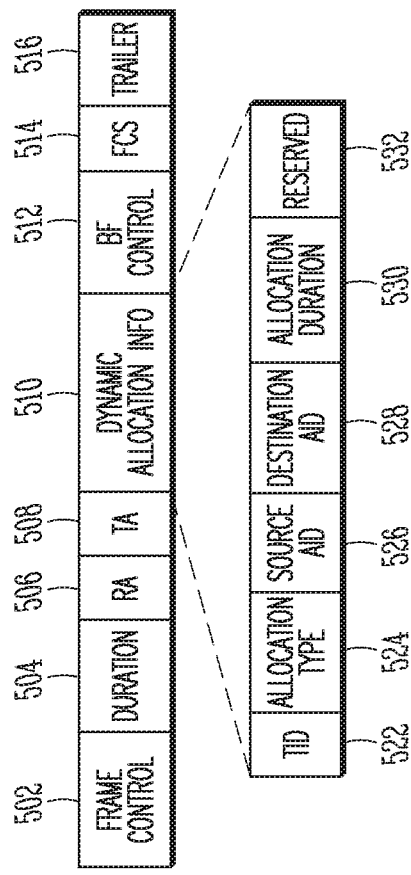
FIG. 5 illustrates a wakeup frame in accordance with some embodiments.

An unmodified Grant frame may be used to schedule a TXOP over a single channel. The wakeup frame, on the other hand, may be configured to schedule a wide bandwidth TXOP using a wide bandwidth channel. The wide bandwidth TXOP may be a TXOP having a bandwidth wider than a single channel, i.e., using bonded channels. FIG. 5 illustrates a wakeup frame in accordance with some embodiments. The wakeup frame 500 may contain a number of fields in the payload, including a frame control field 502, a duration field 504 indicating the remainder of the TXOP or SP the frame 500 belongs to, a receiver address (RA) field 506 indicating the identification of the STA receiving the wakeup frame 500, a transmitter address (TA) field 508 indicating the identification of the STA transmitting the wakeup frame 500, a dynamic allocation information field 510 indicating the channel information to be used during the TXOP, a beamforming (BF) control field 512, and a frame check sequence (FCS) field 514. The wakeup frame 500 may also contain a trailer field 516 containing a control trailer, as well as other fields, as indicated below. The various fields may have different lengths. For example, the frame control field 502, duration field 504 and beamforming control field 512 may each be 2 octets, the RA 506 and TA fields may each be 6 octets, the dynamic allocation information may be 5 octets and the FCS field may be 4 octets. The wakeup frame 500 may be transmitted from the TXOP initiator on a primary channel, that is the channel used to transmit data at its native bandwidth. The dynamic allocation information field 510 will be discussed in more detail below.

The grant frame structure in accordance with the IEEE 802.11ad Specification may not have reserved bits for sending bandwidth information. Accordingly, in some embodiments, a grant frame may be extended to include the trailer field 516 and create the wakeup frame 500. As shown, the trailer field 516 may be inserted at the end of a grant frame to avoid altering the order of the existing fields in the grant frame structure of the current IEEE 802.11ad standard. This may also permit the control trailer to be ignored by legacy IEEE 802.11ad STAs.

The control trailer in the trailer field 516 may include one or more bits to carry bandwidth information. The bandwidth information may indicate the bandwidth of the bonded channels, referred to herein as a wide bandwidth channel. In some embodiments, the control trailer may be configured to be decodable as data or one or more additional PHY fields by non-legacy STAs in accordance with the IEEE 802.11ay Specification. In some embodiments, the control trailer may further include at least information indicating the set of channels that are intended to be used by a wide bandwidth channel and/or an indication of when a TXOP (whether a scheduled service period or a contention-based opportunity) is expected to start over the wide bandwidth channel. This information may enable a TXOP responder to prepare for a wide bandwidth TXOP by opening its receiver to the wider bandwidth for a limited period of time. Thus, the control trailer in the wakeup frame 500 may serve to trigger both reception over a wider bandwidth and for a longer time than a grant frame used in, for example, IEEE 802.11ad communications. Similarly, unlike IEEE 802.11n/ac communications, in which receiver of the TXOP responder may remain open to additional bandwidth indefinitely, draining the STA battery and opening the STA to additional interference unnecessarily, the trigger frame 500 may limit exposure of the TXOP responder to these issues. The TXOP initiator (STA or AP) may thus be configured to signal wide bandwidth TXOP information to a STA operating as a TXOP responder before starting a wide bandwidth TXOP. The use of the wakeup frame 500 additionally may permit both the TXOP responder and the TXOP initiator, rather than the TXOP initiator alone, to assess whether the medium is free in the wide bandwidth channel containing the bonded channels.

In some embodiments, the STAs may be configured to perform one or more operations of channel bonding reservation and/or scheduling as described in more detail below. As above, in various embodiments, dynamic allocation of service period (SP) or a TXOP of contention-based access period (CBAP) may be achieved. Channel bonding may be performed in either case, i.e., as part of dynamic allocation of a service period or during the CBAP.

Figure 6:
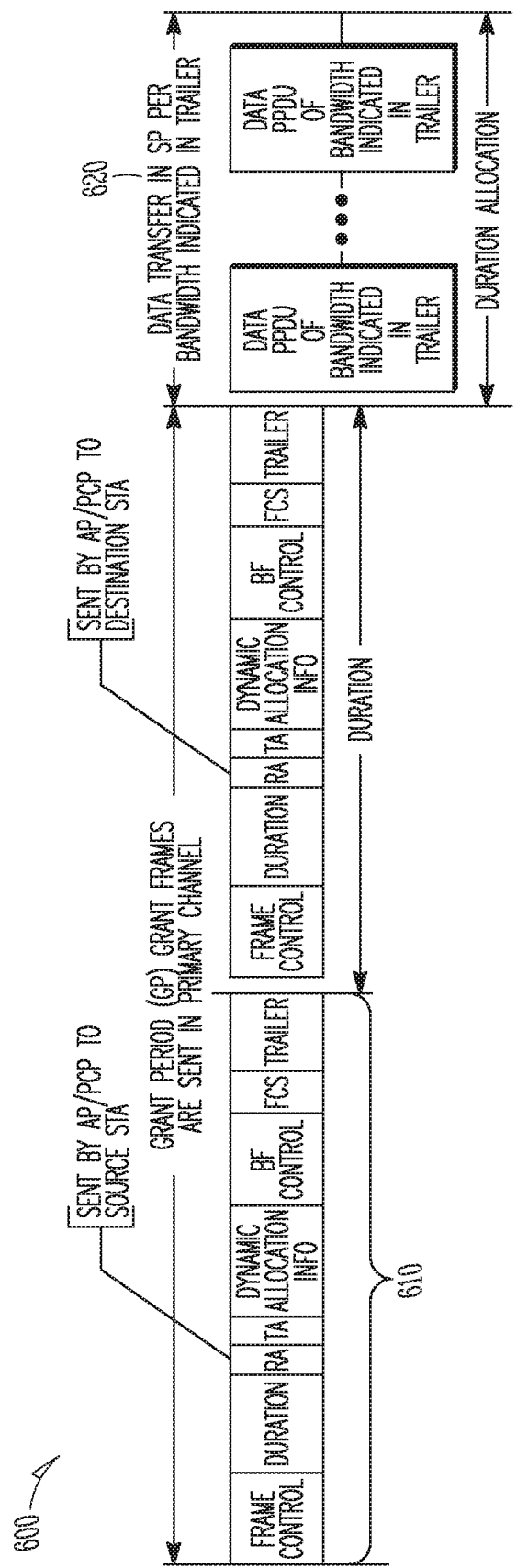
FIG. 6 illustrates channel bonding in dynamic allocation of a service period in accordance with some embodiments.

FIG. 6 illustrates channel bonding in dynamic allocation of a service period in accordance with some embodiments. Some of the communications shown in FIG. 6 may be transmitted by a SP initiator and received by SP responders (source and destination STAs). In some embodiments, the SP initiator and SP responders may be any of the devices shown in FIGS. 1-4, in other embodiments, SP responder may be any of the devices shown in FIGS. 1-4 while the SP initiator may be limited, for example, to the AP, master STA or a PCP STA. The periods shown in FIG. 6 may include a wakeup period containing wakeup frames 610 and a subsequent service period 620 during which data may be transmitted in accordance with the provisioning provided by the wakeup frames 610.

The wakeup frames 610 may be similar to those described in relation to FIG. 5. The wakeup frames 610 may be transmitted over a grant period. The grant period may be predetermined, for example the length of two wakeup frames, and transmitted over the primary channel. In some embodiments, the SP initiator may transmit consecutive wakeup frames 610 to notify the source STA and then the destination STA about a dynamically allocated service period, while in other embodiments, the RA may be switched so that the destination STA and then the source STA is notified. As above, the primary channel may be the channel used by each SP responder prior to expanding to use the wideband channel (containing the bonded channels). In some embodiments the wideband channel may include the primary channel, which may act as an anchor channel for the SP responder. The primary channel for the different SP responders may be the same, in which case the SP initiator may transmit the wakeup frames 610 on the same channel. In some embodiments, primary channel for the different SP responders may be different, in which case the SP initiator may transmit the wakeup frames 610 on different primary channels. When the primary channel for the different SP responders is different, the wideband channel may contain both primary channels to permit the SP responders to communicate during the service period 620.

The control trailer in the wakeup frames 610 may indicate the wideband channel and the bandwidth used during the SP. The SP initiator may be configured to set the channel bandwidth to be not more than the bandwidth capabilities of the SP responders indicated in the wakeup frames 610. In some embodiments, the bandwidth capabilities of each SP responder may be provided to the SP initiator when the SP responder initially attaches to or is connected with the SP initiator.

In some embodiments, the wakeup frames 610 may indicate in the duration field an indication of when a SP is expected to start over the wide bandwidth channel. The timing information in the duration field may indicate the start time of the service period 620 after the wakeup frame 610, e.g., the duration in the last wakeup frame 610 may be 0. In some embodiments, absolute (clock) time may be used. The timing information in the duration field may change to indicate the start time of the service period 620, depending on whether absolute time or relative time (e.g., relative to the particular wakeup frame 610) is used to indicate the service period 620. In response to receiving one or more of the wakeup frames 610, each SP responder may adjust its receiver from reception of transmissions in only the primary channel to receive transmissions over the entire wideband bandwidth in the channels indicated in the control trailer of the wakeup frames 610.

Once the SP starts, the source and destination STA may communicate with over the wideband bandwidth. The duration of the service period 620 may be provided in the dynamic allocation field of the wakeup frame 610. As shown, during the service period 620, Physical Layer Convergence Procedure (PLCP) protocol data units (PPDUs) may be communicated over the wideband bandwidth allocated for the service period 620 for the duration indicated in the wakeup frame 610. Subsequent to the service period 620 (e.g., in response to termination of the wideband SP), each SP responder may return to use of the primary channel only until another set of wakeup frames 610 are received.

Figure 7:
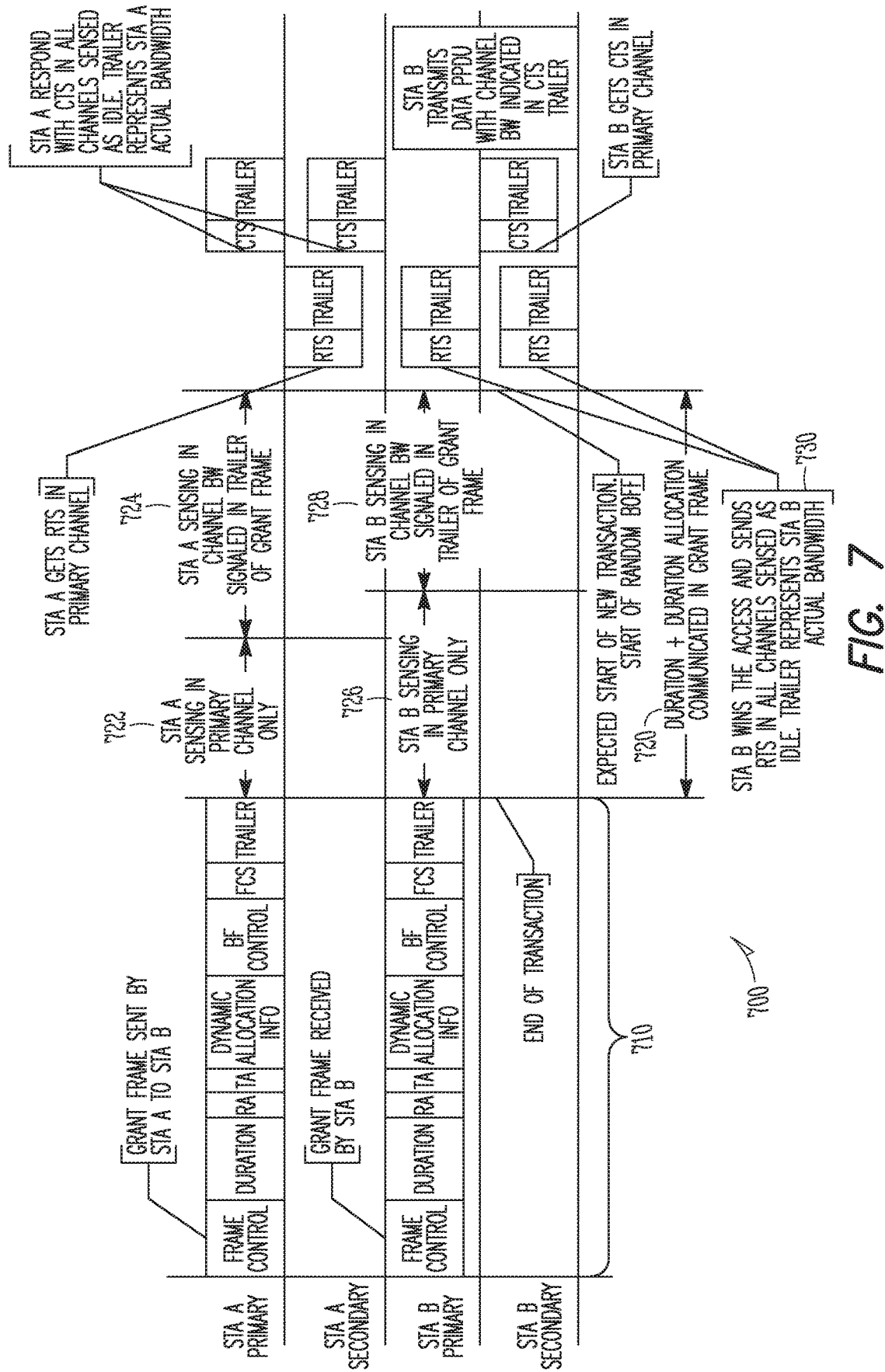
FIG. 7 illustrates channel bonding in a contention-based access period in accordance with some embodiments.

FIG. 7 illustrates channel bonding in a contention-based access period in accordance with some embodiments. The communications shown in FIG. 7 may be between different STAs or other devices, such as STA A and STA B as shown. In some embodiments, STA A may be an AP or PCP while STA B may be a cellphone or other STA. The periods shown in FIG. 7 may include a wakeup period containing a wakeup frame 710, a sensing period 720 and a CBAP period 730. STA A and STA B may each determine the availability of the medium during the sensing period 720. STA A and STA B may communicate data using the wideband channel in accordance with the provisioning provided by the wakeup frames 710 during the CBAP period 730 in a contention-based procedure.

Similar to the above, the wakeup frame 710 may be configured to include a control trailer field. The trailer field may contain wide bandwidth TXOP information to deliver an indication of a potential bandwidth to be used during the wide bandwidth TXOP and the channels to be used. The duration field and dynamic information field may serve to indicate, in a manner similar to that above, the expected TXOP acquisition time to acquire a wide bandwidth TXOP. In some embodiments, the STA A and STA B may be configured to communicate using the same primary channel, with the same secondary channels associated with the primary channel. Rather than the wakeup frame 710 being transmitted sequentially by the TXOP initiator, as shown in FIG. 5, one of the STAs (shown as STA A) may transmit the wakeup frame 710 to another of the STAs (shown as STA B). In response to receiving the wakeup frame 710, STA B may transmit to STA A a grant acknowledgement (Grant ACK) frame to acknowledge reception of the wakeup frame 710 to STA A. The grant ACK frame may be sent in the primary channel. The grant ACK frame may include a control trailer field that contains information representing channel bonding capabilities of the STA B. In some embodiments, once obtained, this information may be stored in the local STAs, in which case resources may be able to be conserved as transmission of the information may be avoided if unchanged from the last communication session between the STAs.

At the end of transmission of the wakeup frame 710, STA A and STA B may engage in a sensing period 720 to detect whether the medium is free. STA A and the STA B may be configured to switch to a potential wide channel of the potential bandwidth at a predetermined time before the expected TXOP acquisition time, which may be different between the STAs. This is shown in FIG. 7 as STA A and STA B may each determine, in a first period, only whether the primary channel is free. The amount of time in the first period may be the same or may differ between STAs. In a second period, STA A and STA B may each determine whether the bonded channels are free, that is, whether the entire wideband bandwidth is free. As above, the amount of time in the second period may be the same or may differ between STAs. Whether the first and second periods are the same or different, however, the total amount of time in sensing period 720 may be the same, and may be indicated in the wakeup frame 710.

Once the sensing period 720 has ended, a backoff timer may be started at each STA at the start of the CBAP period 730. As above, the backoff timer for each STA may be random for the contention-based procedure. After switching to the potential channel, an initiator STA, e.g., STA B, may send a RTS frame on the primary channel and on one or more secondary channels that are sensed by the initiator STA to be idle. The bonded channels may include the primary channel and the one or more secondary channels. The RTS frame may include an indication of the channels sensed as idle, for example, in a control trailer of the RTS frame. In response to the RTS frame, the responder STA, e.g., STA A, may send a CTS frame. The CTS frame may be transmitted only on channels that are sensed by the responder STA as idle. In some embodiments, the CTS frame may include a control trailer. The control trailer of the CTS frame may contain an indication of the channels that are sensed by the responder STA as idle, and thus an indication of a bandwidth sensed by the responder STA as idle.

After receiving the CTS frame, the initiator STA may transmit one or more data PPDUs. The data PPDU transmission may use a bandwidth that is at most the bandwidth indicated in the CTS frame control trailer field. Thus, while the wakeup frame 710 may indicate a desired channel bandwidth and specific channels, the actual channels used may depend on which are indicated to be free in the RTS/CTS trailer. For example, the wakeup frame 710 may indicate 3 channels total (primary and 2 secondary) for communication during the TXOP but due to use, communication may occur only using the primary channel and 1 of the secondary channels as indicated by the RTS/CTS trailer. In response to termination of the CBAP period 730 (wideband TXOP), STA A and STA B may reduce reception from the wide bandwidth channel back to the primary channel.

Figure 8:
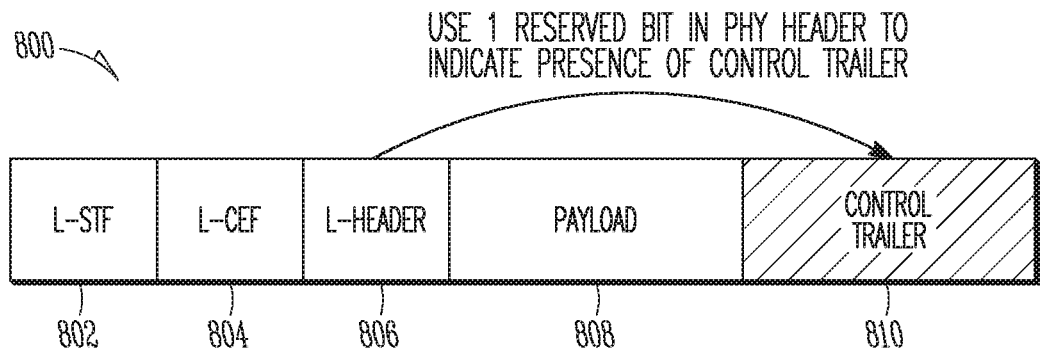
FIG. 8 illustrates a packet structure in accordance with some embodiments.

FIG. 8 illustrates a packet structure in accordance with some embodiments. The control PHY packet 800 may be implemented to introduce a control trailer 810 to any frame sent using a control mode in accordance with, for example, an IEEE 802.11ad Specification. As above, the control trailer may be used, for example, in a grant frame, an RTS frame, a CTS frame, a grant ACK frame, and/or any other control frame to signal one or more types of information for channel bonding and/or for scheduling a TXOP over a wideband channel as described above.

As shown, the control PHY packet 800 may contain several fields, including a legacy (Non-EDMG) Short Training Field (L-STF) 802, a legacy Channel Estimation field (L-CEF) 804, a legacy Header field (L-Header) 806, a Payload field 808 and a control trailer field 810. The L-STF 802 and L-CEF 804 may be used to help signal acquisition, automatic gain control training, predicting the characteristics of the channel for the decoder, frequency offset estimation and synchronization. Both the L-STF 802 and L-CEF 804 may sequences use Golay codes. The L-Header field 806 may indicate the size of the control PHY packet 800 as well as the modulation structure (MCS) of the control PHY packet 800. The L-Header field 806 may further use one of the reserved bits to indicate via the 1-bit indication the presence (or absence) of the control trailer field 810 after the payload 808. In some embodiments, any reserved bit in any field of a control PHY packet may be used to provide this indication. The Payload field 808 may contain some or all of the fields of the wakeup frame indicated in relation to FIGS. 7 and 8, other than the trailer field.

The control trailer field 810 may be configured to encode information on which channels are used to carry the control PHY packet 800. As above, the channel information may be the bonded channels of a wide bandwidth channel. In some embodiments, a STA may be able to decode only one channel, for example, a primary channel and optionally one or more secondary channels. Such a STA may be able to decode the control trailer in the control trailer field 810 and to determine, for example, which channels are used to carry the RTS and/or CTS frames.

As above, one or more fields of a wakeup frame may be configured to indicate channel bandwidth, particular channel and/or timing of a TXOP over a wide bandwidth channel. In some embodiments, however, rather than use a trailer, one or more fields of the wakeup frame may be used to signal channel bandwidth information. For example, as shown in FIG. 5, the dynamic allocation information field 510 may contain several fields including a traffic identification (TID) field 522 that identifies a class of traffic associated with the wakeup frame 500, an allocation type field 524, a source association ID (AID) field 526 that uniquely identifies the source in a particular BSS, but does not necessarily uniquely identify the source globally, a destination AID field 528, an allocation duration field 530, and a reserved field 532. One or more reserved bits of the allocation type field 524 may be used to indicate one or more channel bandwidth configurations. For example, combinations of the reserved bits (say reserved bit 4, 5 and 6) of the allocation type field 524 may be used to indicate the allocation type. For example, 000 (bit 4,5,6) may indicate a service period allocation. 100 may be used to indicate a CBAP allocation, 110 may be used to indicate a secondary 2.16 GHz opportunistic access allocation, 101 may be used to indicate a tertiary 2.16 GHz opportunistic access allocation, etc. Thus, in this example, the first STA may set the duration field 504 and the allocation duration field 530 to signal a rendezvous time at which the first and second STAs are to be available to acquire a TXOP over the wide bandwidth channel. The duration field 504 and the allocation duration field 530 may be set, for example, such that the rendezvous time is a sum of the values indicated by the duration field 504 and the allocation duration field 530.

Figure 9:
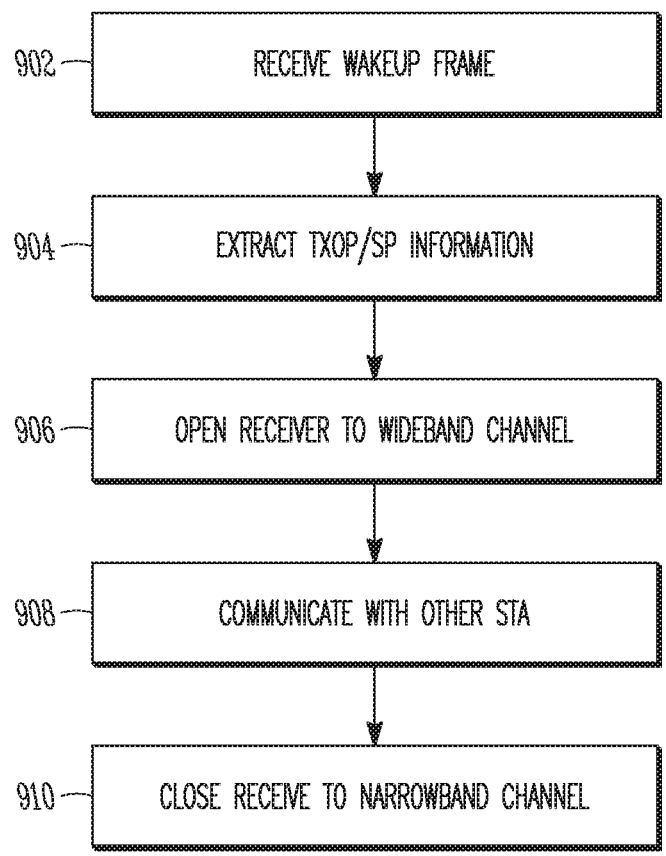
FIG. 9 illustrates a method of controlling wideband communication in accordance with some embodiments.

FIG. 9 illustrates a method of controlling wideband communication in accordance with some embodiments. The method may be performed by any of the STAs shown and described in FIGS. 1-4 and use any of the communications shown and described in FIGS. 5-8. Embodiments of the method may thus include additional or fewer operations or processes in comparison to what is illustrated in FIG. 9. In addition, embodiments of the method are not necessarily limited to the chronological order that is shown in FIG. 9. The method may be practiced with suitable systems, interfaces and components. In addition, while the method and other methods described herein may refer to STAs operating in accordance with IEEE 802.11 or other standards, embodiments of those methods are not limited to just those STAs and may also be practiced by other mobile devices.

At operation 902, the STA may receive a wakeup frame. The wakeup frame may be a grant frame that contains additional information about a TXOP in multiple fields. The wakeup frame may be received on a narrowband primary channel on which the STA is communicating. At this point, the STA may avoid communicating using a wideband channel to reduce interference and battery drain.

At operation 904, the STA may extract the information of the wakeup frame, including the additional TXOP information. For example, the STA may extract from the wakeup frame information indicating whether the wakeup frame was transmitted by an AP or PCP or whether the wakeup frame was transmitted by another STA. The STA may also extract information in a DAI field including the allocation type and duration of one or more of the wakeup frame and TXOP. The allocation type may indicate whether the TXOP is for a CBAP or a service period. A legacy header may indicate the presence of a trailer field/control trailer. The control trailer may indicate the channels to use for the wideband TXOP.

In response to extracting the information from the wakeup frame, the STA may, at operation 906 open up communication (e.g., open up a receiver of the STA) to the wideband channel. The wideband channel may include both the primary channel and one or more secondary channels. The STA may open up reception to the wideband channel immediately after receiving the wakeup frame or, using the information extracted from the wakeup frame, the STA may delay opening up reception to minimize interference/power drain. For example, if the wakeup frame is from an AP, the STA may delay until the other STA with which the STA is to communicate has also received the wakeup frame; or if the wakeup frame is from the other STA, the STA may sense the primary channel initially and then open up to sense the wideband channel.

At the time indicated by the wakeup frame, at operation 908, the STA may communicate with the other STA, transmitting and receiving one or more PPDUs. As above, in cases in which a service period is used, the STA may use dedicated resources (between the STA and the other STA) for communication. In CBAP cases, the STA and other STA may engage in contention-based resolution mechanisms. These mechanisms may include RTS and CTS transmissions that indicate in an additional trailer which channels may be used for each STA for wideband communications.

After communications have been completed, the STAs may once again close down reception to a narrowband channel. This may occur, for example, immediately after the TXOP or may be delayed slightly for ACK/NACK messages and further communications using a narrowband channel. The receiver, in some embodiments, may close down in stages. Reception may thus transition directly from the wideband channel to the primary channel or may transition indirectly, using the primary channel and a secondary channel that is narrower than the wideband channel, eventually transitioning to the primary channel prior to another TXOP being indicated by another wakeup frame.

Example 1 is an apparatus of a station (STA) comprising: memory and processing circuitry arranged to: decode, on a first channel, a wakeup frame comprising an indication of one of a wideband transmission opportunity (TXOP) and a service period (SP) over a wide bandwidth channel that comprises the first channel and another channel; in response to extraction of the indication in the wakeup frame, prior to initiation of the one of the wideband TXOP and SP, open reception of the STA from the first channel to the wide bandwidth channel; and in response to termination of the one of the wideband TXOP and SP, reduce the reception of the STA from the wide bandwidth channel to the first channel.

In Example 2, the subject matter of Example 1 optionally includes that the first channel is a primary Directional Multi-Gigabit (DMG) channel and the other channel comprises a secondary channel associated with the primary channel, communication at least one of encoded and decoded through use of baseband circuitry of the STA.

In Example 3, the subject matter of any one or more of Examples 1-2 optionally include that the one of the wideband TXOP and SP is a SP, and the wakeup frame comprises a duration that indicates a start of the wideband TXOP after the wakeup frame and a dynamic allocation information field comprising an allocation duration that indicates a length of the wideband TXOP.

In Example 4, the subject matter of any one or more of Examples 1-3 optionally include that the wakeup frame comprises a grant frame comprising a control trailer, the control trailer comprising the indication.

In Example 5, the subject matter of Example 4 optionally includes that a Physical Layer (PHY) header of the wakeup frame comprises a legacy Header field (L-Header) field comprising a reserved bit that indicates presence of the control trailer.

In Example 6, the subject matter of any one or more of Examples 1-5 optionally include that the wakeup frame comprises a transmitter address that indicates the wakeup frame originated from one of an access point (AP) and Personal Basic Service Set (PBSS) control point (PCP), the one of the wideband TXOP and SP is the SP, and the processing circuitry is configured to decode the wakeup frame within a grant period during which another wakeup frame configured to indicate the SP is sent to another STA from the one of the AP and PCP.

In Example 7, the subject matter of Example 6 optionally includes that the processing circuitry is further arranged to: at least one of encode transmissions to and decode transmissions from the other STA during the SP.

In Example 8, the subject matter of any one or more of Examples 1-7 optionally include that the one of the wideband TXOP and SP is the wideband TXOP, the wakeup frame comprises a transmitter address that indicates the wakeup frame originated from another STA, and the processing circuitry is configured to at least one of encode transmissions to and decode transmissions from the other STA during the wideband TXOP.

In Example 9, the subject matter of Example 8 optionally includes that the wakeup frame comprises a duration and a dynamic allocation information field comprising an allocation duration, the duration and allocation duration configured to indicate a rendezvous time at which the STA is to be available for the wideband TXOP over the wide bandwidth channel.

In Example 10, the subject matter of any one or more of Examples 8-9 optionally include that the processing circuitry is further configured to: in response to the indication and prior to the wideband TXOP, perform channel sensing in the first channel for a first period of time and subsequently switch to channel sensing in the wide bandwidth channel.

In Example 11, the subject matter of Example 10 optionally includes that the processing circuitry is further configured to: subsequent to performing the channel sensing in the wide bandwidth channel, engage in a Contention Based Access Period (CBAP) to acquire the wideband TXOP.

In Example 12, the subject matter of Example 11 optionally includes that to engage in the contention-based channel access mechanism, the processing circuitry is configured to: generate a request-to-send (RTS) to the other STA in all channels sensed as idle, the channels including a primary channel and a first potential secondary channel, the RTS comprising a control trailer that indicates an actual bandwidth of the STA.

In Example 13, the subject matter of Example 12 optionally includes that to engage in the contention-based channel access mechanism, the processing circuitry is further configured to: in response to transmission of the RTS, decode a clear-to-send (CTS) from the other STA in the primary channel, the CTS comprising a control trailer that indicates an actual bandwidth of the other STA.

In Example 14, the subject matter of Example 13 optionally includes that the processing circuitry is further configured to: in response to the CTS, generate a Physical Layer Convergence Procedure (PLCP) protocol data unit (PPDU) comprising a bandwidth indicated in the control trailer of the CTS for transmission in the primary channel and at least one of the first and second potential secondary channel, the bandwidth indicated in at least one of the RTS and CTS being at most a bandwidth of the wide bandwidth channel.

In Example 15, the subject matter of any one or more of Examples 1-14 optionally include that the wakeup frame comprises a dynamic allocation information field comprising an allocation type field, the allocation type field comprising reserved bits whose combinations indicate an allocation type of the wakeup frame, the allocation type comprising one of a plurality of channel bandwidth configurations indicating a type of the one of the wideband TXOP and SP, the dynamic allocation information field comprising a bandwidth of the wide bandwidth channel.

In Example 16, the subject matter of any one or more of Examples 1-15 optionally include, further comprising: an antenna arranged to transmit and receive communications with another STA during the one of the wideband TXOP and SP.

Example 17 is an apparatus of a wireless device, the apparatus comprising: memory, and processing circuitry arranged to: encode, for transmission over a primary channel, a first wakeup frame comprising a first receiver address (RA) that indicates a first STA, an indication of a service period and an indication of a wide bandwidth channel that comprises the primary channel and a secondary channel, the first wakeup frame configured to trigger the first STA to open reception from the primary channel to the wide bandwidth channel prior to the service period and reduce reception from the wide bandwidth channel to the primary channel after the service period; and encode, for transmission over the primary channel, a second wakeup frame comprising a second RA that indicates a second STA, an indication of the service period and an indication of the wide bandwidth channel, the second wakeup frame configured to trigger the second STA to open reception from the primary channel to the wide bandwidth channel prior to the service period and reduce reception from the wide bandwidth channel to the primary channel after the service period.

In Example 18, the subject matter of Example 17 optionally includes that the wakeup frame comprises a transmitter address that indicates the wakeup frame originated from one of an access point (AP) and personal basic service set (PBSS) control point STA (PCP).

In Example 19, the subject matter of any one or more of Examples 17-18 optionally include that the service period is configured for dedicated communications between the first and second STAs over the wide bandwidth channel.

In Example 20, the subject matter of any one or more of Examples 17-19 optionally include that the wakeup frame comprises a duration that indicates a length of the wakeup frame and a dynamic allocation information field comprising an allocation duration that indicates a length of the service period.

In Example 21, the subject matter of any one or more of Examples 17-20 optionally include that the wakeup frame comprises a grant frame comprising a control trailer, the control trailer comprising the indication.

In Example 22, the subject matter of Example 21 optionally includes that a Physical Layer (PHY) header of the wakeup frame comprises a legacy Header field (L-Header) field comprising a reserved bit that indicates presence of the control trailer.

In Example 23, the subject matter of any one or more of Examples 17-22 optionally include that the wakeup frame comprises an allocation type field comprising reserved bits whose combinations indicate an allocation type of the wakeup frame, the allocation type comprising one of a plurality of channel bandwidth configurations.

Example 24 is a computer-readable storage medium that stores instructions for execution by one or more processors of a station (STA), the one or more processors to configure the STA to: receive, on a primary channel, a wakeup frame comprising: a dynamic allocation information (DAI) field comprising an indication of one of a service period and a Contention Based Access Period (CBAP) to acquire a wideband transmission opportunity (TXOP) over a wide bandwidth channel, and a trailer field comprising a control trailer, the control trailer comprising an indication of the wide bandwidth channel, the wide bandwidth channel comprising the primary channel and a secondary channel; in response to the wakeup frame, open reception of the STA from the primary channel to the wide bandwidth channel prior to the one of the service period and CBAP; communicate with another STA during the one of the service period and CBAP using the wide bandwidth channel; and in response to termination of the one of the service period and CBAP, reduce the reception of the STA from the wide bandwidth channel to the primary channel.

In Example 25, the subject matter of Example 24 optionally includes that when the DAI field indicates the service period; the wakeup frame comprises a duration that indicates a length of the wakeup frame and a dynamic allocation information field comprising an allocation duration that indicates a length of the service period, the wakeup frame comprises a transmitter address that indicates the wakeup frame originated from one of an access point (AP) and personal basic service set (PBSS) control point (PCP) STA and the one or more processors further configure the STA to receive the wakeup frame within a grant period during which another wakeup frame configured to indicate the service period is sent to the other STA from the one of the AP and PCP.

In Example 26, the subject matter of any one or more of Examples 24-25 optionally include that when the DAI field indicates the CBAP; the wakeup frame comprises a duration and a dynamic allocation information field comprising an allocation duration, the duration and allocation duration configured to indicate a rendezvous time at which the STA is to be available for the CBAP over the wide bandwidth channel, the wakeup frame comprises a transmitter address that indicates the wakeup frame originated from the other STA, and the one or more processors further configure the STA to, prior to the CBAP, perform channel sensing in the first channel for a first period of time and subsequently switch to channel sensing in the wide bandwidth channel.

In Example 27, the subject matter of Example 26 optionally includes that the one or more processors further configure the STA to: transmit a request-to-send (RTS) to the other STA in all channels sensed as idle, the channels including the primary channel and a first potential secondary channel, the RTS comprising a control trailer that indicates an actual bandwidth of the STA, in response to transmission of the RTS, receive a clear-to-send (CTS) from the other STA in the primary channel and a second potential secondary channel, the CTS comprising a control trailer that indicates an actual bandwidth of the other STA, and in response to the CTS, generate a Physical Layer Convergence Procedure (PLCP) protocol data unit (PPDU) comprising a bandwidth indicated in the control trailer of the CTS for transmission in the primary channel and at least one of the first and second potential secondary channel.

Example 28 is a method of controlling channel use of a station (STA), the method comprising: receiving, on a primary channel, a wakeup frame comprising: a dynamic allocation information (DAI) field comprising an indication of one of a service period and a Contention Based Access Period (CBAP) to acquire a wideband transmission opportunity (TXOP) over a wide bandwidth channel, and a trailer field comprising a control trailer, the control trailer comprising an indication of the wide bandwidth channel, the wide bandwidth channel comprising the primary channel and a secondary channel; in response to receiving the wakeup frame, opening reception of the STA from the primary channel to the wide bandwidth channel prior to the one of the service period and CBAP; communicating with another STA during the one of the service period and CBAP using the wide bandwidth channel; and in response to termination of the one of the service period and CBAP, reducing the reception of the STA from the wide bandwidth channel to the primary channel.

In Example 29, the subject matter of Example 28 optionally includes that when the DAI field indicates the service period; the wakeup frame comprises a duration that indicates a length of the wakeup frame and a dynamic allocation information field comprising an allocation duration that indicates a length of the service period, the wakeup frame comprises a transmitter address that indicates the wakeup frame originated from one of an access point (AP) and personal basic service set (PBSS) control point (PCP) STA and the method further comprises receiving the wakeup frame within a grant period during which another wakeup frame configured to indicate the service period is sent to the other STA from the one of the AP and PCP; and when the DAI field indicates the CBAP; the wakeup frame comprises a duration and a dynamic allocation information field comprising an allocation duration, the duration and allocation duration configured to indicate a rendezvous time at which the STA is to be available for the CBAP over the wide bandwidth channel, the wakeup frame comprises a transmitter address that indicates the wakeup frame originated from the other STA, and the method further comprises, prior to the CBAP, performing channel sensing in the first channel for a first period of time and subsequently switching to channel sensing in the wide bandwidth channel.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of an enhanced directional multi gigabit (EDMG) station (STA), the apparatus comprising: memory; and processing circuitry coupled to the memory, the processing circuitry configured to:
    decode a non EDMG physical layer convergence procedure (PLCP) protocol data unit (PPDU), the non-EDMG PPDU comprising a legacy header (L-Header), the L-Header comprising a field that indicates a control trailer is present, the non-EDMG PPDU further comprising a grant frame, the grant frame indicating an intent to transmit to the STA on a bonded channel an EDMG PPDU at a time indicated by a value of an allocation duration field, the control trailer indicating the bonded channel, wherein the non-EDMG PPDU is received from a peer STA; and
    decode the EDMG PPDU, wherein the EDMG PPDU is received on the bonded channel from the peer STA.

2. The apparatus of claim 1, wherein the processing circuitry is further configured to:
    decode the control trailer after a data portion of the non-EDMG PPDU.

3. The apparatus of claim 1, wherein the control trailer comprises a bit to indicate whether each 2.16 GHz channel of a plurality of 2.16 GHz channels is included in the bonded channels.

4. The apparatus of claim 1, wherein the grant frame is received on a primary channel, and wherein the bonded channels include the primary channel.

5. The apparatus of claim 4, wherein the processing circuitry is further configured to:
    in response to the grant frame, configure the STA to operate over the bonded channels before the time indicated by the value of the allocation duration field.

6. The apparatus of claim 1, wherein the processing circuitry is further configured to:

in response to a signal indicating a completion of receiving the EDMG PPDU, configure the STA to operate on a 2.16 GHz channel that the non-EDMG PPDU is to be received on.

7. The apparatus of claim 1, wherein the grant frame comprises a receiver address field, and the receiver address field indicates an address of the STA.

8. The apparatus of claim 1, wherein the bonded channels are in a 60 GHz band.

9. The apparatus of claim 1, wherein the grant frame indicates the EDMG PPDU is to be transmitted in a service period (SP).

10. The apparatus of 1, further comprising: transceiver circuitry, the transceiver circuitry coupled to the processing circuitry; and receive antennas, the receive antennas coupled to the transceiver circuitry, wherein the processing circuitry is further configured to:
in response to the grant frame, configure the receive antennas to a directional antenna pattern for the bonded channels before the time indicated by the value of the allocation duration field.

11. The apparatus of claim 1, wherein the grant frame comprises a transmitter address that indicates the grant frame originated from one of an access point (AP) and Personal Basic Service Set (PBSS) control point (PCP).

12. The apparatus of claim 1, wherein the STA is configured to operate in accordance with Institute of Electrical and Electronic Engineers (IEEE) 11ay.

13. The apparatus of claim 1, further comprising transceiver circuitry coupled to the processing circuitry, and one or more antennas coupled to the transceiver circuitry.

14. A non-transitory computer-readable storage medium that stores instructions for execution by one or more processors of an apparatus of an enhanced directional multi gigabit (EDMG) station (STA), the instructions to configure the one or more processors to:
decode a non EDMG physical layer convergence procedure (PLCP) protocol data unit (PPDU), the non-EDMG PPDU comprising a legacy header (L-Header), the L-Header comprising a field that indicates a control trailer is present, the non-EDMG PPDU further comprising a grant frame, the grant frame indicating an intent to transmit to the STA on a bonded channel an EDMG PPDU at a time indicated by a value of an allocation duration field, the control trailer indicating the bonded channel, wherein the non-EDMG PPDU is received from a peer STA; and
decode the EDMG PPDU, wherein the EDMG PPDU is received on the bonded channel from the peer STA.

15. The non-transitory computer-readable storage medium of claim 14, wherein the instructions further configure the one or more processors to:
decode the control trailer after a data portion of the non-EDMG PPDU.

16. The non-transitory computer-readable storage medium of claim 14, wherein the non-EDMG PPDU is received on a primary channel, and wherein the bonded channels includes the primary channel.

17. The non-transitory computer-readable storage medium of claim 16, wherein the instructions further configure the one or more processors to:
in response to the grant frame, configure the STA to operate over the bonded channels before the time indicated by the value of the allocation duration field.

18. A method performed by an apparatus of an enhanced directional multi gigabit (EDMG) station (STA), the method comprising:
decoding a non EDMG physical layer convergence procedure (PLCP) protocol data unit (PPDU), the non-EDMG PPDU comprising a legacy header (L-Header), the L-Header comprising a field that indicates a control trailer is present, the non-EDMG PPDU further comprising a grant frame, the grant frame indicating an intent to transmit to the STA on a bonded channel an EDMG PPDU at a time indicated by a value of an allocation duration field, the control trailer indicating the bonded channel, wherein the non-EDMG PPDU is received from a peer STA; and
decoding the EDMG PPDU, wherein the EDMG PPDU is received on the bonded channel from the peer STA.

19. The method of claim 18, wherein the method further comprises: decoding the control trailer after a data portion of the non-EDMG PPDU.

20. An apparatus of an access point (AP) or Personal Basic Service Set (PBSS) control point (PCP) the apparatus comprising: memory and processing circuitry configured to:
encode a non-enhanced directional multi gigabit (EDMG) physical layer convergence procedure (PLCP) protocol data unit (PPDU), the non-EDMG PPDU comprising a legacy header (L-Header), the L-Header comprising a field that indicates a control trailer is present, the non-EDMG PPDU further comprising a grant frame, the grant frame indicating an intent to transmit to a station (STA) on bonded channels an EDMG PPDU at a time indicated by a value of an allocation duration field, the grant frame comprising the control trailer, the control trailer indicating the bonded channels;
generate signaling to cause the AP or the PCP to transmit the non-EDMG PPDU to a peer station (STA);
encode the EDMG PPDU; and
generate signaling to cause the AP or the PCP to transmit the EDMG PPDU at the time indicated by the value of the allocation duration field on the bonded channels to the peer STA.

21. The apparatus of claim 20, wherein the processing circuitry is further configured to:
encode the control trailer after a data portion of the non-EDMG PPDU.

22. The apparatus of claim 20, wherein the control trailer comprises a bit to indicate whether each 2.16 GHz channel of a plurality of 2.16 GHz-channels is included in the bonded channels.

23. The apparatus of claim 20, wherein the processing circuitry is further configured to:
generate signaling to cause the AP or the PCP to transmit the grant frame to the peer STA on a primary channel, wherein the bonded channels includes the primary channel.

24. The apparatus of claim 20, further comprising transceiver circuitry coupled to the processing circuitry; and one or more antennas coupled to the transceiver circuitry.

\* \* \* \* \*